(12) United States Patent
Kotecha et al.

(10) Patent No.: US 10,819,413 B2
(45) Date of Patent: Oct. 27, 2020

(54) BEAM TRACKING IN WIRELESS COMMUNICATION

(71) Applicant: NXP USA, INC., Austin, TX (US)

(72) Inventors: Jayesh H. Kotecha, Austin, TX (US); Jayakrishnan Cheriyath Mundarath, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/188,561

(22) Filed: Nov. 13, 2018

(65) Prior Publication Data

US 2020/0153498 A1 May 14, 2020

(51) Int. Cl.
*H04B 7/02* (2018.01)
*H04B 7/06* (2006.01)
*H04B 17/318* (2015.01)
*H04B 17/26* (2015.01)
*H04B 7/0426* (2017.01)
*H04B 7/0417* (2017.01)

(52) U.S. Cl.
CPC ........... *H04B 7/0695* (2013.01); *H04B 7/043* (2013.01); *H04B 7/0421* (2013.01); *H04B 7/0617* (2013.01); *H04B 17/26* (2015.01); *H04B 17/318* (2015.01)

(58) Field of Classification Search
CPC ...... H04B 7/0695; H04B 7/26; H04B 17/318; H04B 7/0421; H04B 7/043; H04B 7/0617; H04B 7/0639; H04B 7/06827; H04B 7/0834; H04B 7/088; H04B 5/0048; H04B 7/02; H04B 7/0408; H04W 64/003; H04W 72/042; H04W 24/10; H04W 16/28; H04W 72/046; H04L 5/0048
USPC ............... 375/267, 299, 347, 356, 358, 377; 455/99, 101, 132
See application file for complete search history.

(56) References Cited

U.S. PATENT DOCUMENTS

| | | | |
|---|---|---|---|
| 7,065,383 B1 * | 6/2006 | Hovers | .................... H04B 7/04 370/335 |
| 2017/0207845 A1 | 7/2017 | Moon et al. | |
| 2018/0049042 A1 | 2/2018 | Yu et al. | |
| 2019/0037426 A1 * | 1/2019 | Yu | .......................... H04L 5/0048 |
| 2019/0068263 A1 * | 2/2019 | Yu | ........................ H04B 7/0617 |
| 2019/0103908 A1 * | 4/2019 | Yu | ........................ H04B 7/0695 |

OTHER PUBLICATIONS

Sharetechnote, "5G/NR—Beam Management," pp. 1-11, retrieved from http://www.sharetechnote.com/ on Dec. 13, 20019.*

(Continued)

*Primary Examiner* — Tesfaldet Bocure

(57) ABSTRACT

A base station is configured to provides a beam change feedback channel for a user equipment to communicate unsolicited beam change feedback to the base station. If the user equipment determines that a beam other than the beam to which the user equipment is tuned has a stronger signal, the user equipment initiates a transmission on the beam change feedback channel to the base station indicating a beam change. The base station uses the feedback from the user equipment to update the beam to the user equipment.

18 Claims, 6 Drawing Sheets

(56) References Cited

OTHER PUBLICATIONS

ZTE Corporation, "Enhancements on beamformed CSI-RS," 3GPP TSG RAN WG1 Meeting #86 R1-166324 Gothenburg, Sweden Aug. 22-26, 2016: Item: 7.2.4.1.2; Document for: Discussion and Decision ZTE Corporation 3GPP TSG RAN WG1 Meeting #86 R1-166324 Gothenburg, Sweden Aug. 22-26, 2016, 4 pages.*

ZTE Corporation et al., "Beam selection and CSI acquisition for NR MIMO" 3GPP TSG RAN WG1 Meeting #86 R1-166212, Agenda Item: 8.1., Gothenburg, Sweden Aug. 22-26, 2016, 6 pages.*

3GPP, "3rd Generation Partnership Project; Technical Specification Group Radio Access Network; NR; Physical Channels and Modulation," 3 GPP TS 38.211; v. 15.10; Mar. 2018; 91 pages.

* cited by examiner

BEAM TRACKING IN WIRELESS COMMUNICATION

BACKGROUND

A wireless communication system includes one or more transmitters (e.g., base stations) and one or more receivers (e.g. user equipment). Base stations and user equipment can be both transmitters and receivers when both base stations and user equipment include a receiver and a transmitter. Base stations and user equipment typically communicate with each other via a cellular network. Cellular networks, such as those implemented in the high frequency (mmWave) band 5G-NR network, utilize highly directed transmitted and received beams to mitigate propagation path loss of radio waves and to increase their coverage.

Beamforming is a technique using antenna arrays such that signals at particular angles constructively interfere with one another and signals at other angles destructively interfere with one another. Beamformers use a set of weights and phases to combine signals from the antenna array elements to form desired beams. Directional beamforming is set up during an initial acquisition phase by a base station transmitting periodic synchronization signal blocks on time-multiplexed transmitted beams on a downlink and a user equipment scanning its received beams to lock on to one of the synchronization signal block transmissions and decode broadcast messages. The user equipment then communicates the strongest (best) downlink transmitted beam to the base station. The best received beam direction may also be used as the user equipment's best uplink direction for transmission to the base station.

However, the best downlink and uplink beams are subject to change over time due to several factors including user equipment mobility and changes in propagation conditions. Due to these factors and changes, connection quality may degrade between the base station and user equipment and the user equipment may even lose coverage altogether when the downlink and uplink beams are out of sync, a condition defined as beam failure. Beam failure requires a complete resync of the beams and is a costly process in terms of cellular throughput. Hence, it is advantageous to continuously track the best beams to not only avoid beam failure but to also maintain best effort connection quality. Tracking beams and determining a current best beam consumes bandwidth resources.

In current cellular standards, like 5G-NR, beam tracking is facilitated by a base station-initiated solicited mechanism in which periodic downlink channel state information reference signals (CSI-RS) for measuring beam strengths by the user equipment and use of a higher layer (RRC and MAC layers) facilitated feedback of beam change information are scheduled by the base station. This base station-solicited mechanism inherently has two disadvantages: high control overhead and slow beam updates. Reducing the control overhead can be obtained by reducing CSI-RS measurement and feedback periodicity, but it comes at the cost of even slower beam updates. And vice-versa, increasing measurement and feedback periodicity to improve beam tracking results in even higher control overhead and bandwidth resources. It can be thus appreciated that there is a need for an efficient and improved mechanism for beam tracking.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
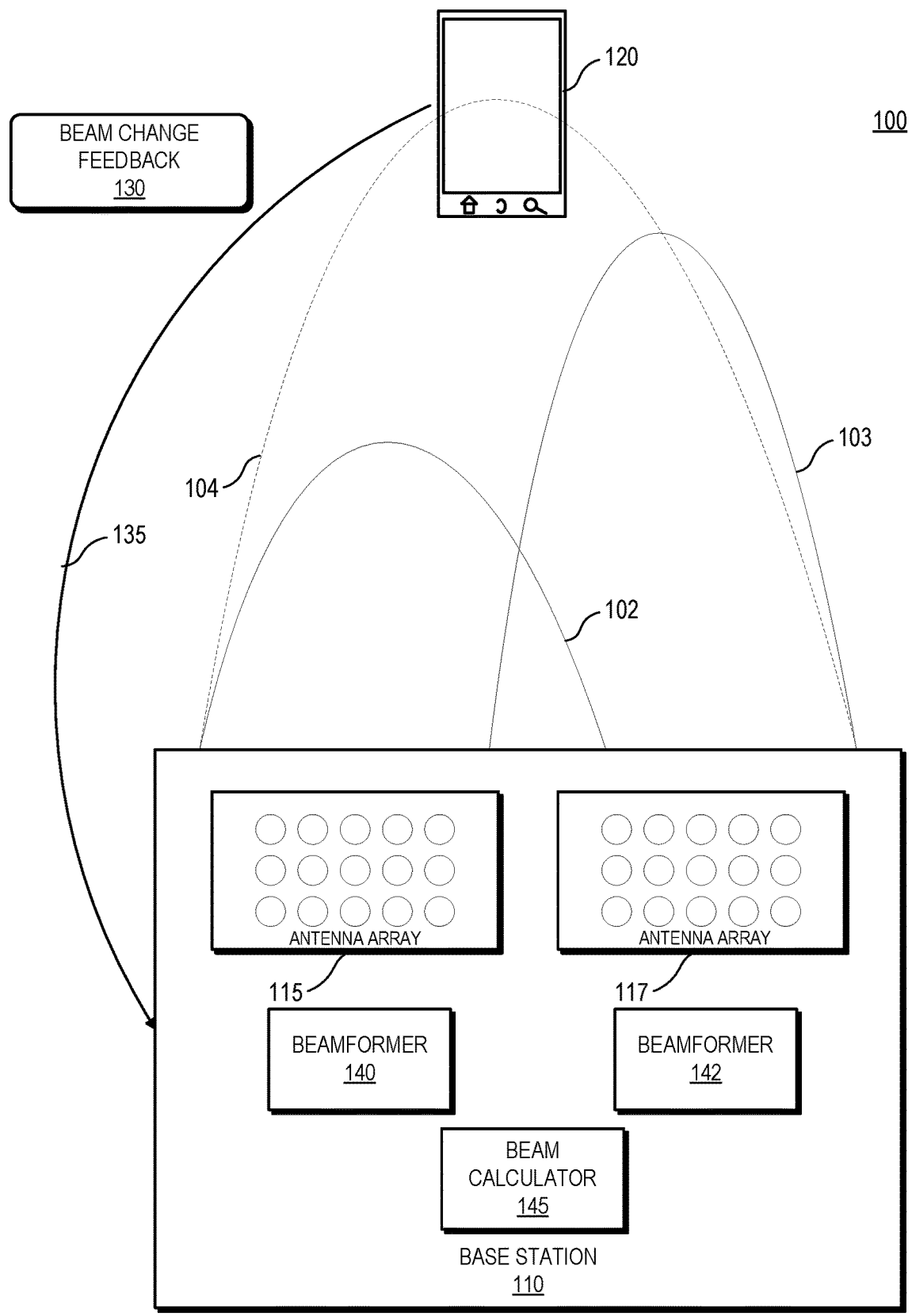
FIG. 1 is a block diagram of a wireless communication system including a base station configured to apply updated beamforming weights to transmit to a user equipment in response to receiving unsolicited indications of beam changes from the user equipment in accordance with some embodiments.

An apparatus, system, architecture, methodology, and program code are described herein for an unsolicited user equipment-initiated transmission of a change in the best downlink (transmitted beam selection for beamforming by the base station using a beamforming change feedback channel, where the base station uses the feedback from the user equipment to update its downlink transmitted beam to the user equipment. As disclosed herein, FIGS. 1-6 illustrate systems and techniques for a base station to update a downlink transmitted beam selection based on reception of an unsolicited user equipment-initiated feedback for changing the downlink transmitted beam to the user equipment for beamforming. The user equipment compares the powers of its received beams and determines whether the transmitted beam to which the user equipment is tuned is currently the strongest transmitted beam. If the user equipment determines that a transmitted beam other than the transmitted beam to which the user equipment is tuned has a stronger signal, the user equipment initiates a transmission on a beamforming change feedback channel to the base station indicating a beam change.

In certain embodiments, in response to receiving the transmission from the user equipment indicating the beam change, the base station issues a physical uplink control channel (PUCCH) or physical uplink shared channel (PUSCH) grant for the user equipment to transmit a detailed beam change message. In response to the grant, the user equipment provides detailed beam change information to the base station on the PUCCH or PUSCH. Based on the detailed beam change information received from the user equipment, the base station calculates an updated beam direction. The base station uses beamforming weights corresponding to the updated beam direction to transmit an updated downlink transmitted beam to the user equipment.

In some other embodiments, the base station uses the beam change indicator message to initiate a beam switch for the user equipment. In one example, based on a 1-bit indication for a beam change, the base station may first shift the transmitted beam in one direction (from the current one) and wait for further indication from the user equipment. If an additional message is soon received on the beamforming change feedback channel, the base station will try switching the transmitted beam to the other direction. In another example, 2 bits may be used in the beamforming change feedback message to indicate the "direction" in which the transmitted beam should be shifted. To summarize, in such an embodiment, the initial indication on the beamforming change feedback channel is sufficient for the base station to adapt its transmitted beam as per the user equipment feedback. This is a very low overhead enablement of the method described within this disclosure.

Conventionally, a base station in an mmWave network uses periodic downlink reference signals such as channel state information reference signals (CSI-RS) to solicit feedback messages from each user equipment (UE) regarding beam-tracking and beam refinement, which can incur significant overhead when periodically monitoring all UEs. Further, a conventional solicited messaging structure queries all UEs using common signaling across UEs, regardless of each UE's short-term mobility characteristics and hence how quickly the channel characteristics of each individual UE are changing. As a result, a conventional solicited messaging structure either over-queries UEs whose channel characteristics are relatively static, thus using more signaling and bandwidth overhead than is necessary, or under-queries UEs whose channel characteristics are highly dynamic, thus resulting in decreased link quality and performance. By relying on UE-initiated unsolicited beamforming change feedback messages (i.e., dynamically sent by the UE, if and when the UE determines that a beam change needs to be communicated to the base station) in response to a UE detecting a beamforming change, the base station reduces measurement overhead and feedback overhead.

FIG. 1 illustrates a wireless communication system 100 including a base station 110 configured to apply updated beamforming weights to transmit to one or more UEs 120 (only one of which is illustrated in the interest of clarity) in response to receiving unsolicited indications of beam intensity changes from the user equipment 120 in accordance with some embodiments. The wireless communication system 100 includes a network of base stations 110 (only one of which is illustrated in the interest of clarity) for providing wireless connectivity into a corresponding geographic area. The base stations 110 may be interconnected by wired or wireless backhaul connections in a backhaul network (not shown). Information can be exchanged between the base stations 110 using the backhaul network.

Base station 110 provides wireless connectivity to user equipment 120, for example, for supporting downlink (or forward link) communication from the base station 110 to the user equipment 120 and uplink (or reverse link) communication from the user equipment 120 to the base station 110. The combination of a base station 110 and a user equipment 120 may be considered a transmitter receiver pair.

The base station includes antenna arrays 115, 117, a beam calculator 145, and beamformers 140, 142. The antenna arrays 115, 117 are configured to transmit and receive signals over an air interface. Although the example illustrated in FIG. 1 includes two antenna arrays 115, 117, in some embodiments the base station 110 includes one antenna array, and in some embodiments the base station 110 includes more than two antenna arrays. Embodiments including two or more antenna arrays 115, 117 (referred to as a multi-beam transmission system) transmit a UE's signal on multiple beams. The base station 110 balances transmit power for each beam to be proportional to the received power of the beam at the UE. In embodiments including a single antenna array 115 (referred to as a single beam transmission system), the base station 110 adjusts beamforming weights to beamform in the perceived direction of the UE.

The beam calculator 145 is configured to calculate an updated beam direction $\theta_{opt}$ for a downlink transmitted beam to the user equipment 120. The beam calculator 145 is implemented as, for example, processors executing software, programmable logic, hard-coded logic, or a combination thereof.

The beamformers 140, 142 are configured to apply beamforming weights corresponding to the updated beam direction $\theta_{opt}$ to change the amplitude and phase of signals transmitted to the antenna arrays 115, 117 for transmission to the user equipment 120. The beamformers 140, 142 are implemented as, for example, processors executing software, programmable logic, hard-coded logic, or a combination thereof. In some embodiments, the beamformers 140, 142 are analog beamformers configured to split a transmitted data stream into as many ways as there are array elements in the antenna arrays 115, 117. The beamformers 140, 142 pass the signal in each branch through a phase shifter (not shown) and an amplifier (not shown) before feeding the signal into the array elements, applying the beamforming weights calculated by the beam calculator 145.

The quality of communications between the base station 110 and the user equipment 120 can become degraded by interference from objects such as buildings, trees, persons, and other structures. The powers of the transmitted beams are therefore subject to change based on, for example, mobility of the user equipment and any intervening objects. Upon detecting a change in the power profiles of the different TX beams based on the changes in the measured signal powers across the multiple TX beams, the UE 120 initiates a transmission to the BS 110 on a beamform change feedback (BCF) channel 135 signaling an indication of a beam change (e.g., beam change feedback 130). In some embodiments, the BCF channel 135 is a "BCF opportunity" on the physical uplink control channel (PUCCH) resource when the PUCCH resource is otherwise not being used. A "BCF opportunity" is a PUCCH resource scheduled for the user equipment 120 by the base station 110 in which the UE 120 can indicate a beam change. In some embodiments, the base station 110 schedules the BCF opportunity 135 to be periodic with an offset, subject to the resources being available on the PUCCH on the periodic instance. The base station 110 controls and signals the availability of BCF opportunities 135, including their periodicity and resource sizes, for each of the UEs 120. For example, in some embodiments, the base station 110 adjusts the availability of BCF opportunities 135 for a user equipment 120 based on the user equipment 120's measurement and feedback capability. Thus, in some embodiments, the BS 110 makes the BCF opportunity 135 available based on beam measurement occasions available to the user equipment 120, such that the user equipment 120 can update the base station 110 using the BCF opportunity 135 after a measurement occasion. For fixed UEs 120, for which beams are not expected to change frequently, the base station 110 may provide lower BCF opportunity 135 availability or periodicity to reduce overhead. For example, the base station 110 may turn off the BCF opportunity 135 for a period of time to reduce the PUCCH load. The BCF opportunity 135 can be multiplexed with hybrid automatic repeat query (HARQ) ACK/NACK, Scheduling Request (SR), and channel state information (CSI), according to 3rd Generation Partnership Project (3GPP) standards.

To illustrate, in an embodiment, the base station 110 transmits periodic synchronization signal blocks (SSBs) (not shown) in all transmitted directions, across multiple transmitted beams, as a part of acquisition broadcast messages. The user equipment 120 monitors downlink SSBs transmitted by the base station 110 across the subset of transmitted beams beam 102 and beam 103 received by the user equipment 120. In some embodiments, instead of monitoring downlink SSBs, the user equipment 120 monitors the strengths of channel state information-reference signals (CSI-RS) that the base station 110 periodically transmits to UEs 120 to determine the relative strength of the downlink transmitted beam to which the user equipment 120 is currently tuned compared to other transmitted beams received by the user equipment 120. In the illustrated example, the signal power of beam 103 is greater than that of beam 102, but neither beam 103 nor beam 102 is optimal for the location of the user equipment 120. In response to detecting that a beam change is needed, the user equipment 120 initiates a transmission to the base station 110 on the beamforming change feedback channel 135 signaling an indication of a beam change (also referred to as a beamforming change feedback (BCF) message 130). In some embodiments, the BCF message 130 includes a single bit to indicate that the user equipment 120 has detected a beam change. In some embodiments, the BCF message 130 includes an up/down (+1/-1) beam indication or an integer number of beams (+N/-N) to move over from the downlink transmitted beam to which the user equipment 120 is currently tuned. In some embodiments, the message configurations of the BCF messages 130 are controlled and configured in the higher layers by the base station 110.

In response to receiving the BCF message 130, in some embodiments the base station 110 schedules a sounding reference signal (SRS) message in the uplink using the indicated changed beam (updated beam) 104 to estimate the uplink signal to noise ratio (SNR) for the updated beam. In other embodiments, the base station 110 schedules an uplink physical uplink control channel (PUCCH) grant or physical uplink shared channel (PUSCH) grant using a physical downlink control channel (PDCCH) for the user equipment 120 to feedback beam change information such as transmitted beam index/indices and their respective received signal strength indicator or reference signal received power. In response to receiving the beam change information at the base station 110, the beam calculator 145 calculates the updated beam direction $\theta_{opt}$ and the corresponding beamforming weights. The beamformer 140 applies the beamforming weights to change the amplitude and phase of signals transmitted to the antenna arrays 115, 117 for transmission to the UE 120 across an updated beam 104.

Figure 2:
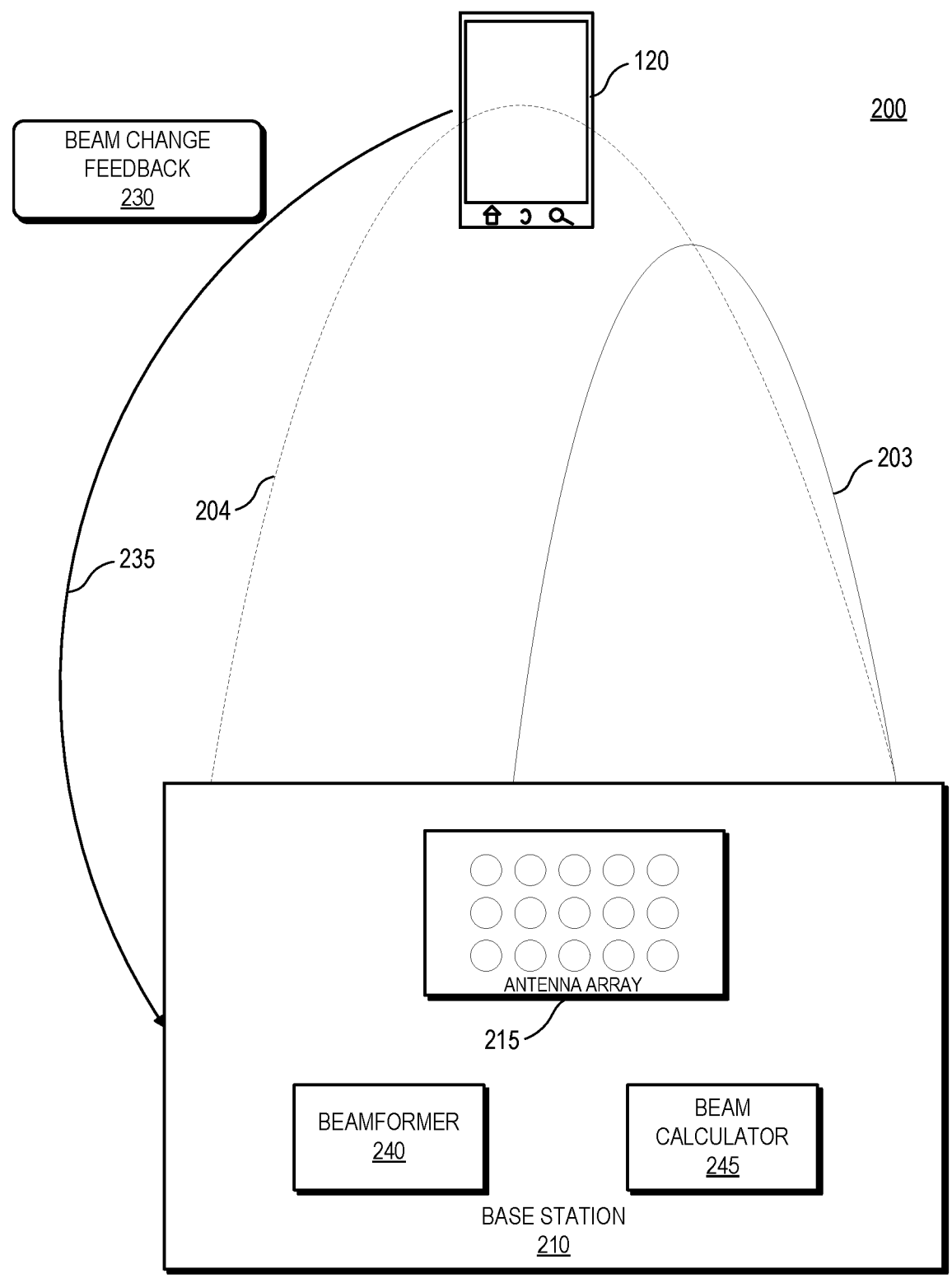
FIG. 2 is a block diagram of a wireless communication system including a single-beam transmission base station configured to apply updated beamforming weights to transmit to a user equipment in response to receiving unsolicited indications of beam changes from the user equipment in accordance with some embodiments.

FIG. 2 illustrates a wireless communication system similar to the wireless communication system of FIG. 1 but which includes a single-beam transmission base station configured to apply updated beamforming weights to transmit to a user equipment in response to receiving unsolicited indications of beam changes from the user equipment in accordance with some embodiments. The base station includes antenna array 215, a beam calculator 245, and a beamformer 240. The beam calculator 245 and beamformer 240 are configured to perform functions similar to and are implemented similarly to the beam calculator 145 and beamformer 145 of FIG. 1. The antenna array 115 is configured to transmit and receive signals over an air interface. The base station 210 adjusts beamforming weights to beamform in the perceived direction of the user equipment 120.

To illustrate, in operation, the base station 210 transmits periodic beam measurement (PBM) signals such as synchronization signal blocks (SSB) or CSI-RS (not shown) across the transmitted beam 203. The user equipment 120 monitors downlink PBMs transmitted by the base station 210 across the transmitted beam 203. In the illustrated example, the signal power of beam 203 is not optimal for the location of the user equipment 120. In response to detecting that a beam change is needed, the UE 120 initiates a transmission to the base station 210 on the beamforming change feedback (BCF) channel 235 signaling an indication of a beam change 230 (also referred to as a BCF message). In some embodiments, the BCF message 230 includes a single bit to indicate that the user equipment 120 has detected a beam change.

In response to receiving the BCF message 230, the base station 210 schedules an uplink PUCCH grant or PUSCH grant using PDCCH for the user equipment 120 to feedback beam change information such as reference signal received power. In response to receiving the beam change information at the base station 110, the beam calculator 245 calculates the updated beam direction $\theta_{opt}$ and the corresponding beamforming weights. The beamformer 240 applies the beamforming weights to change the amplitude and phase of signals transmitted to the antenna array 215 for transmission to the user equipment 120 across an updated beam 204.

Figure 3:
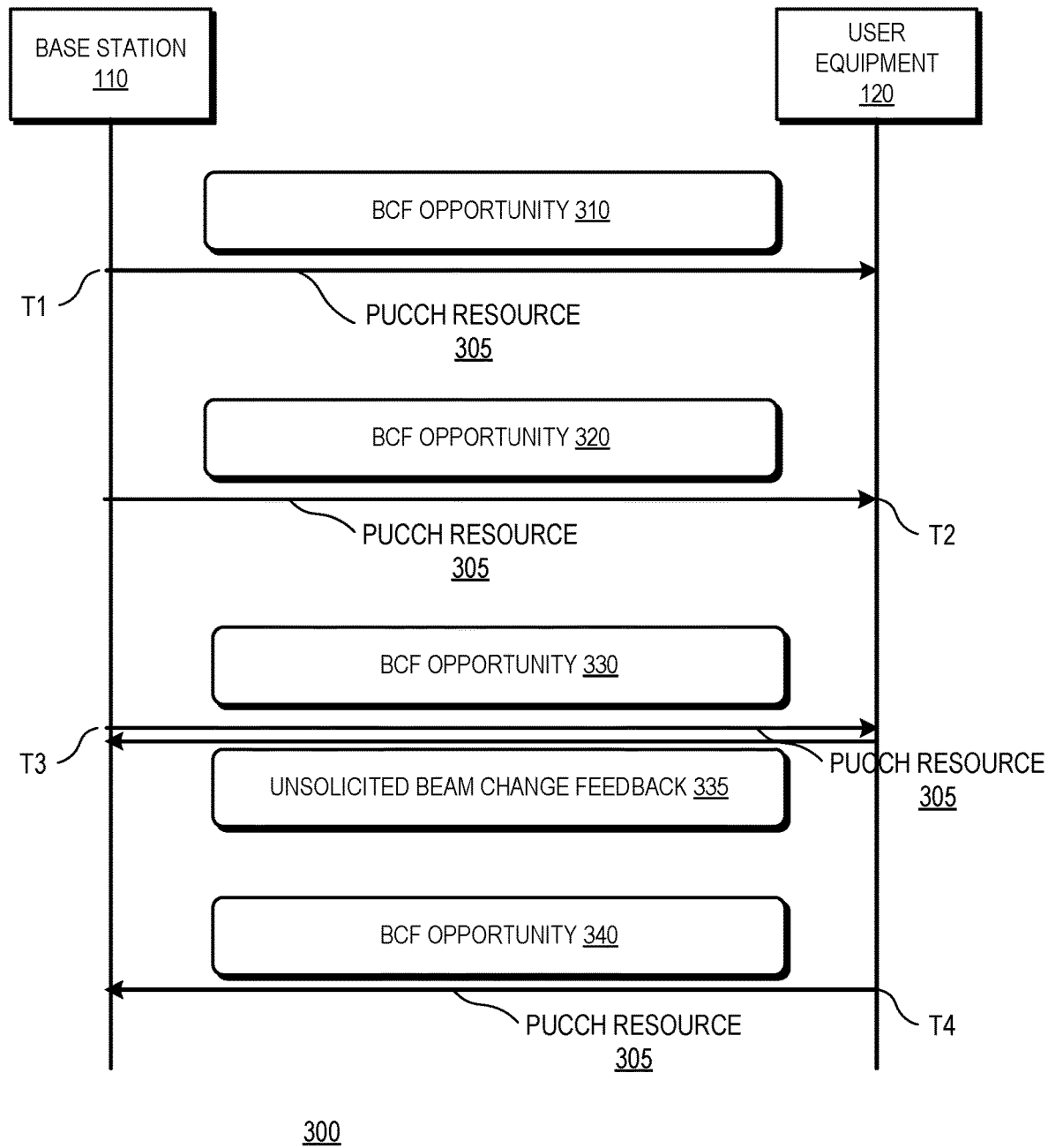
FIG. 3 is a diagram illustrating a method of providing a periodic opportunity on a channel between a base station and a user equipment for the user equipment to provide unsolicited beamforming change feedback to the base station in accordance with some embodiments.

FIG. 3 is a diagram illustrating a method of providing a periodic opportunity on a channel between a base station and a user equipment for the user equipment to provide unsolicited beamforming change feedback to the base station in accordance with some embodiments. At a time T1, the base station 110 provides a first periodic beamforming change feedback (BCF) opportunity 310 for the user equipment 120 to communicate an unsolicited beamforming change feedback to the base station 110. In the illustrated example, the base station 110 provides the BCF opportunity 310 as an otherwise unused resource on the physical uplink control channel (PUCCH) 305. At time T1, the user equipment 120 does not have a beamforming change feedback to communicate to the base station 110, and therefore does not make use of the BCF opportunity 310.

At a time T2, the base station 110 provides a second periodic BCF opportunity 320 on the otherwise unused PUCCH resource 305 for the user equipment 120 to communicate an unsolicited beamforming change feedback to the base station 110. Again at time T2, the user equipment 120 does not have a beamforming change feedback to communicate to the base station 110, and therefore does not make use of the BCF opportunity 320.

At a time T3, the base station 110 provides a third periodic BCF opportunity 330 on the otherwise unused PUCCH resource 305 for the user equipment 120 to communicate an unsolicited beamforming change feedback to the base station 110. At time T3, the user equipment 110 communicates a beamforming change feedback to the base station 110 in response to detecting a change in received beams.

At time T4, the base station 110 provides a fourth periodic BCF opportunity 340 on the otherwise unused PUCCH resource 305 for the user equipment 120 to communicate an unsolicited beamforming change feedback to the base station 110. As with time T1 and T2, at time T4, the user equipment 120 does not have a beamforming change feedback to communicate to the base station 110, and therefore does not make use of the BCF opportunity 340. By structuring the periodic BCF opportunities such that the user equipment sends unsolicited beamforming change feedback messages only when the user equipment determines that a beam change needs to be communicated to the base station, the base station reduces measurement overhead and feedback overhead.

Figure 4:
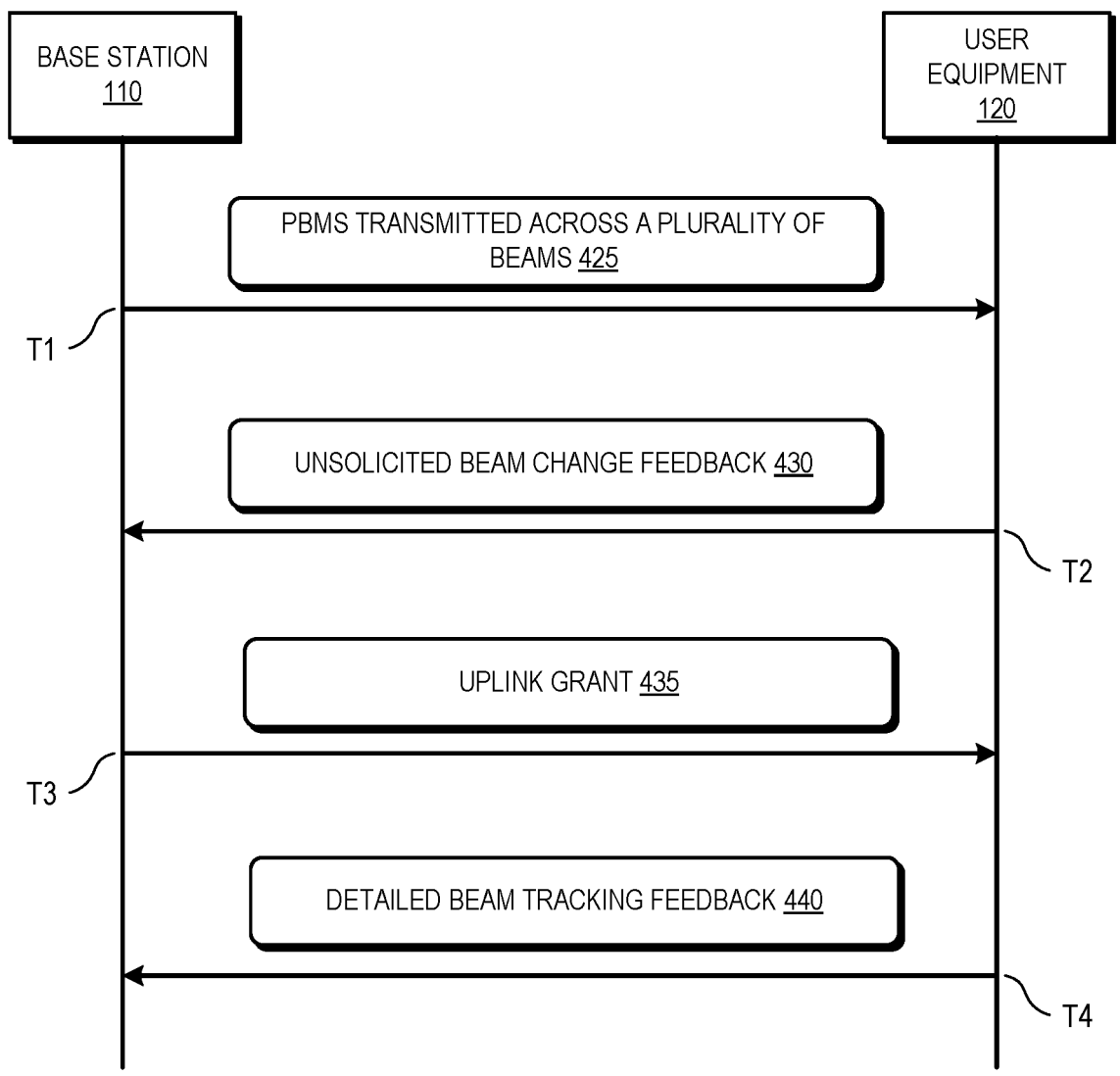
FIG. 4 is a diagram illustrating a method of receiving unsolicited user equipment-initiated beamforming change feedback at a base station in accordance with some embodiments.

FIG. 4 is a diagram illustrating a method 400 of receiving unsolicited user equipment 120-initiated beamforming change feedback at a base station 110 in accordance with some embodiments. At a time T1, the base station 110 transmits periodic beam measurement signals such as synchronization signal blocks (SSB) or channel state information reference signals (CSI-RS) across a plurality of beams 425. The user equipment 120 monitors the powers of the periodic beam measurement signals across the subset of transmitted beams that are received by the user equipment 120. Upon detecting that the power of the downlink transmitted beam to which the user equipment 120 is currently tuned is exceeded by the power of another transmitted beam by more than a threshold amount, at a time T2, the user equipment 120 transmits an unsolicited indication of a beamforming change feedback (BCF) message 430 across the BCF channel 135 described in FIG. 1. In response to receiving the BCF message 430, at a time T3, the BS 110 issues an uplink PUCCH or PUSCH grant 435 to the user equipment 120 so the user equipment 120 can provide a detailed beam change message to the base station 110. Upon receiving the uplink grant 435, at a time T4, the user equipment 120 provides beam change feedback 440 to the base station 110.

Figure 5:
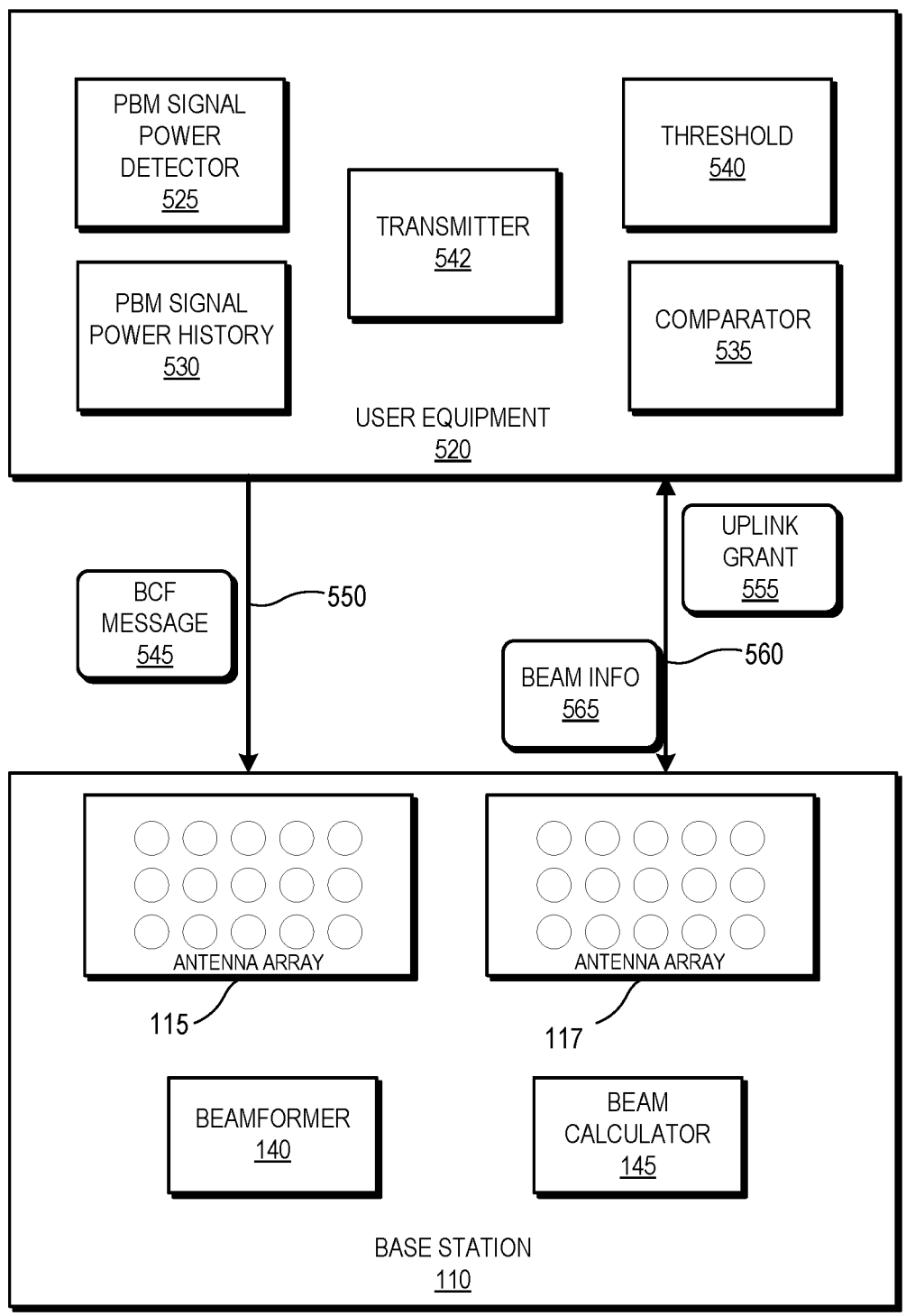
FIG. 5 is a block diagram of a wireless communication system including a user equipment configured to provide unsolicited beamforming change feedback to a base station in accordance with some embodiments.

FIG. 5 is a block diagram of a wireless communication system 500 including a user equipment 520 configured to provide unsolicited beamforming change feedback to a base station 110 in accordance with some embodiments. The base station 110 broadcasts periodic beam measurement signals (PBMs) (e.g., SSBs or CSI-RS signals) (not shown). The user equipment 520 monitors PBMs (not shown) received on each transmitted beam in the subset of transmitted beams that are received by the user equipment 520. The user equipment 520 includes a PBM signal power detector 525, a PBM signal power history 530, a threshold 540, a comparator 535, and a transmitter 542. The transmitter 542 is configured to communicate an unsolicited beam change feedback message 545 to the base station 110 regarding the PBMs received by the user equipment 520 from the base station 110. The PBM signal power detector 525 measures the intensities of the PBMs received on each transmitted beam in the subset. The PBM signal power history 530 stores information regarding a previous set of the strongest transmitted beams and their respective powers.

In some embodiments, the comparator 535 compares the powers of the previous set of strongest transmitted beams with the powers of the PBMs received on each transmitted beam in the subset and determines whether the differences between the powers exceed the threshold 540. In some embodiments, the threshold 540 is set by the manufacturer of the user equipment 540. In some embodiments, the threshold 540 is dynamically adjusted based on a history of received signal powers. If the powers of the PBMs received on one of the transmitted beams exceed the powers of the previous set of strongest transmitted beams by more than the threshold 540, the user equipment 520 determines that a beam change is required. In some embodiments, the comparator 535 compares the intensities of the PBMs received on each transmitted beam in the subset with the intensity (or SNR) of the DL transmissions on the transmitted beam to which the user equipment 520 is currently tuned. If the comparator 535 determines that the intensity of the PBMs received on a transmitted beam exceeds the intensity of the downlink transmissions on the transmitted beam to which the user equipment 520 is currently tuned by more than the threshold 540, the user equipment 520 determines that a beam change is required.

In some embodiments, the user equipment 520 monitors transmitted beams from a set S(n), where n is a measurement instance. The set includes transmitted beams with received powers (intensities) that exceed a predefined threshold. The user equipment 520 defines $p(n)=\{p_m(n): m \in S(n)\}$ where $p_m(n)$ is a power metric such as RSSI or RSRP for beam index m. The user equipment 520 calculates a distance metric $d(n)=f_{dist}(p(n), p(n-1))$, where $f_{dist}(\cdot)$ is a function that calculates the distance between the sets $p(n)$ and $p(n-1)$, and $p(n-1)$ denotes the power metric calculated in a previous measurement time instance. In some embodiments, the user equipment 520 describes $f_{dist}(\cdot)$ as follows: the user equipment 520 defines vectors $u=[u_1 u_2 \ldots u_M]^T$ and $v=[v_1 v_2 \ldots v_M]^T$ where M is the maximum number of transmitted beams and $$u_m = \begin{cases} p_m(n) & \text{if } m \in S_M(n) \\ 0 & \text{otherwise} \end{cases}$$

$$v_m = \begin{cases} p_m(n-1) & \text{if } m \in S_M(n-1) \\ 0 & \text{otherwise} \end{cases}$$

The user equipment 520 then calculates $d(n)=\|u-v\|$. If $d(n) > T_{ch}$, where $T_{ch}$ is a predefined distance threshold 540, the transmitter 542 of the user equipment 520 sends a beamforming change feedback (BCF) message 545 through the BCF channel 550. In response to receiving the BCF message 545, the BS 110 issues an uplink grant 555 to the user equipment 520 on the physical uplink control channel (PUCCH) or physical uplink shared channel (PUSCH) 560. The transmitter 542 of the user equipment 520 then transmits beam change information 565 to the BS 110 on the PUCCH or PUSCH 560. In some embodiments, the beam information 565 is a control message containing packet with an updated beam structure (referred to as comprehensive signaling). In other embodiments, the beam information 565 is a control message containing packet signaling an updated beam direction (referred to as compact signaling).

For comprehensive signaling, in some embodiments, the user equipment 520 transmits the updated beam structure as follows:

$K=|S(n)|$ $\{m_i(n): m_i(n)=m, \forall m \in S(n)\}$ $\{r_i(n): r_i(n)=p_m(n), \forall m \in S(n)\}$ wherein K is the number of beams, $m_i(n)$ is the beam index, $i=0, 1, \ldots, K-1$, and $r_i(n)$ is the received signal strength indicator (or reference signal received power) for each signaled beam, $i=0, 1, \ldots, K-1$, S(n) is the set of beam indices $\{m_i(n)\}$ at time instance n signaled in the structure.

In response to receiving the updated beam structure beam information 565 at the BS 110, the beam calculator 145 first calculates weighting factors $$w_i(n) = \left\{ \frac{r_i(n)}{\sum_{j=1}^{K} r_j(n)}, i = 0, 1, \ldots, K-1 \right\}$$

Then the updated beam direction is calculated as a weighted sum:

$$\theta_{opt}(n) = \sum_{i=0}^{K-1} w_i(n) \theta_{m_i(n)}$$

The beamformer 140 then applies beamforming weights corresponding to $\theta_{opt}$ to transmit to the user equipment 520.

For compact signaling, in some embodiments, the user equipment 520 provides a beam index defined as a real number, $q_{index}$. The user equipment 520 calculates the beam index based on an assumption that the base station 110 beam indices are ordered according to their mutual proximities. For example, beams {m−1, m, m+1} refer to three adjacent beams, with m being the central beam. The user equipment 520 calculates an updated beam direction as a weighted superposition of multiple dominant transmitted beams:

$$\text{Calculate } w_m = \frac{\sum_{m \in S} p_m(n)}{p_m(n)}, \forall m \in S(n)$$

$$\text{Calculate updated beam index, } q_{index} = \sum_{m \in S(n)} m w_m$$

The transmitter 542 transmits the updated beam index $q_{index}$ to the base station 110. In response to receiving the updated beam index $q_{index}$, the beam calculator 145 calculates $$m_b = \text{mod}(\lfloor q_{index} \rfloor, M)$$

and $\alpha = q_{index} - m_b$ wherein $\theta_1$ and $\theta_2$ are the angles/directions corresponding to beam indices $m_b$ and $m_b+1$, respectively. The beam calculator 145 calculates the updated beam direction $$\theta_{opt} = (1-\alpha)\theta_1 + \alpha\theta_2$$

Here, α represents a scaling factor between 0 and 1 and represents a ratio of the distance of the user equipment from the center of beam 2 to the distance from the center of beam 1. The beamformer 140 then uses beamforming weights corresponding to $\theta_{opt}$ to transmit to the user equipment 520.

Figure 6:
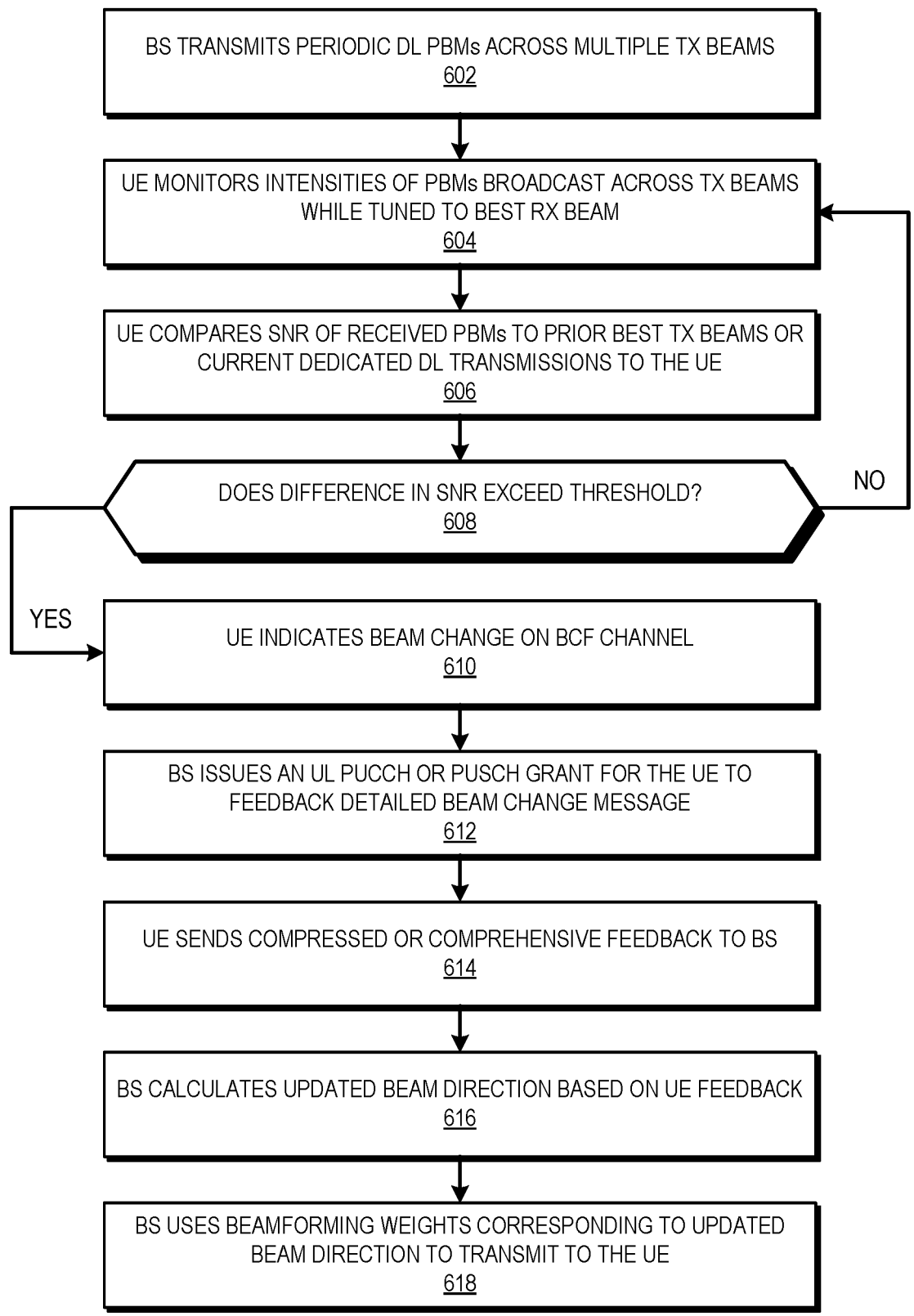
FIG. 6 is a flow diagram of a method for updating beamforms based on unsolicited user equipment-initiated feedback in accordance with some embodiments.

FIG. 6 is a flow diagram of a method 600 for updating beams based on unsolicited user equipment-initiated feedback implemented by the wireless communication system 100 of FIG. 1 in accordance with some embodiments. At block 602, the base station 110 transmits periodic downlink periodic beam measurement signals across multiple transmitted beams. At block 604, the user equipment 120 monitors the intensities of periodic beam measurement signals broadcast across the subset of transmitted beams received by the user equipment 120 that have received powers above a predefined threshold. At block 606, in some embodiments, the user equipment 120 compares the signal-to-noise ratio of each received periodic beam measurement signal to the strengths of previously received "best" transmitted beams. In other embodiments, at block 606, the user equipment 120 compares the signal-to-noise ratio of each received periodic beam measurement signal to the strength of the current dedicated downlink transmissions to the user equipment 120. At block 608, the user equipment 120 determines if the difference in strengths exceeds a threshold.

If, at block 608, the user equipment 120 determines that the difference in strengths does not exceed the threshold, the method flow reverts back to block 604. If, at block 608, the user equipment 120 determines that the difference in strengths exceeds the threshold, the method flow continues to block 610. At block 610, the user equipment transmits an unsolicited beamforming change feedback (BCF) message on the BCF channel to the base station 110. At block 612, in response to receiving the BCF message, the base station 110 issues an uplink PUCCH or PUSCH grant for the user equipment 120 to feedback a detailed beam change message. At block 614, the user equipment 120 sends either a compressed feedback or a comprehensive feedback to the base station 110. At block 616, the base station 110 calculates an updated beam direction based on the feedback from the user equipment 120. At block 618, the base station 110 applies beamforming weights corresponding to the updated beam direction to transmit to the user equipment 120.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a base station, an unsolicited beam change feedback transmitted by a user equipment, wherein
the user equipment transmits the unsolicited beam change feedback in response to detecting a change in the best beams from the base station to the user equipment,
detecting the change in the best beams from the base station to the user equipment comprises
maintaining a signal power history of previously received beams transmitted by the base station, and
comparing a power of a currently received beam to the powers of the previously received beams; and
applying, at the base station, updated beamforming weights based on the unsolicited beam change feedback to transmit an updated beam to the user equipment.

2. The method of claim 1, further comprising:
scheduling, at the base station, a periodic opportunity for the user equipment to transmit the unsolicited beam change feedback.

3. The method of claim 1, further comprising:
at the base station, scheduling a physical uplink control channel resource for the user equipment to transmit a beam change feedback,
wherein said receiving comprises receiving from the user equipment on the physical uplink control channel resource a beam change feedback.

4. The method of claim 3, further comprising:
issuing, at the base station, in response to receiving the beam change feedback, an uplink grant for the user equipment to communicate to the base station additional information regarding the change in best beams.

5. The method of claim 4, further comprising:
receiving, at the base station, additional information regarding the updated best beam from the user equipment;
calculating, at the base station, an updated beam direction based on the additional information; and
applying beamforming weights corresponding to the updated beam direction to transmit the updated beam to the user equipment.

6. A method comprising:
providing, at a base station, a beam change feedback channel for a user equipment to communicate an unsolicited beam change feedback;
applying, at the base station, updated beamforming weights based on the unsolicited beam change feedback to transmit an updated beam to the user equipment;
issuing, by the base station, an uplink grant for the user equipment to communicate, to the base station, information regarding the beams received by the user equipment in response to receiving the beam change feedback;
receiving, by the base station, additional information from the user equipment regarding the beams received by the user equipment;
calculating, by the base station, an updated beam direction based on the additional information; and
applying, by the base station, beamforming weights corresponding to the updated beam direction to transmit the updated beam to the user equipment.

7. The method of claim 6, further comprising:
scheduling, at the base station, a periodic opportunity for the user equipment to transmit the unsolicited beam change feedback.

8. The method of claim 7, wherein said scheduling comprises scheduling a physical uplink control channel resource.

9. The method of claim 7, wherein the periodic opportunity is periodic with an offset.

10. The method of claim 7, wherein a frequency of the periodic opportunity is based on at least one of a measurement and feedback capability of the user equipment.

11. The method of claim 7, wherein the base station adjusts the frequency of the periodic opportunity based on mobility of the user equipment.

12. The method of claim 7, wherein the periodic opportunity can be dependent on beam measurement occasions available to the user equipment, so that the user equipment can make an update after a measurement occasion.

13. A user equipment comprising:
a signal power detector configured to detect a change in best beams received by the user equipment from a base station;
a signal power history of previously received beams transmitted by the base station;
a comparator configured to compare a power of a currently received beam to the powers of the previously received beams based on the signal power history with a threshold value; and
a transmitter configured to communicate an unsolicited beam change feedback to the base station regarding beams received by the user equipment from the base station in response to the signal power detector detecting the change in the best beams and the comparator determining the power difference is greater than the threshold.

14. The user equipment of claim 13, wherein transmitter is configured to transmit the beam change feedback on a beam change feedback channel comprising an opportunity scheduled by the base station on a physical uplink control channel resource.

15. A method executed by a user equipment in a wireless communication system, the method comprising:
detecting a change in best beams received by the user equipment from a base station;
comparing, against a threshold value, a power of a currently received beam to powers of previously received beams based on a signal power history when a change best beams is detected; and
transmitting an unsolicited beam change feedback message to the base station regarding beams received by the user equipment from the base station in response to determining the power difference is greater than the threshold.

16. The method of claim 15 further comprising:
transmitting the unsolicited beam change feedback on a beam change feedback channel comprising an opportunity scheduled by the base station on a physical uplink control channel resource.

17. The method of claim 15 further comprising:
storing strengths of previously received best beams in the signal power history,
wherein said comparing comprises comparing the signal-to-noise ratio of the best beams received by the user equipment to the signal-to-noise ratio of previously received best beams.

18. The method of claim 15 further comprising:
receiving a request from the base station for detailed information regarding the unsolicited beam change feedback;
transmitting comprehensive feedback information to the base station in response to the request from the base station for detailed information.

* * * * *